United States Patent
Menezes

(10) Patent No.: US 7,637,612 B2
(45) Date of Patent: Dec. 29, 2009

(54) OPHTHALMIC LENSES FOR PREVENTION OF MYOPIA PROGRESSION

(75) Inventor: Edgar V. Menezes, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 240 days.

(21) Appl. No.: 11/751,205

(22) Filed: May 21, 2007

(65) Prior Publication Data

US 2008/0291393 A1    Nov. 27, 2008

(51) Int. Cl.
G02C 7/04    (2006.01)
G02C 7/06    (2006.01)
A61F 2/16    (2006.01)

(52) U.S. Cl. .................. 351/161; 351/169; 623/6.28
(58) Field of Classification Search .................. 351/161; 623/6.28
See application file for complete search history.

(56) References Cited

U.S. PATENT DOCUMENTS

| | | |
|---|---|---|
| 5,139,325 A | 8/1992 | Oksman et al. |
| 6,045,578 A | 4/2000 | Collins et al. |
| 6,457,826 B1 | 10/2002 | Lett |
| 6,474,814 B1 | 11/2002 | Griffin |
| 6,537,317 B1 | 3/2003 | Steinert et al. |
| 6,874,887 B2 | 4/2005 | Tyson |
| 2003/0045931 A1 | 3/2003 | Lang |
| 2006/0232743 A1* | 10/2006 | Legerton ............... 351/246 |
| 2007/0115431 A1* | 5/2007 | Smith et al. ............ 351/221 |
| 2007/0159601 A1* | 7/2007 | Ho et al. ............... 351/221 |
| 2007/0296916 A1* | 12/2007 | Holden et al. .......... 351/161 |

FOREIGN PATENT DOCUMENTS

| | | |
|---|---|---|
| EP | 1055145 B1 | 10/2005 |
| WO | WO 96/16621 A1 | 6/1996 |
| WO | WO 2005/040895 A1 | 5/2005 |
| WO | WO 2005/055891 A1 | 6/2005 |
| WO | WO 2007/041796 A1 | 4/2007 |
| WO | WO 2007/146673 A2 | 12/2007 |
| WO | WO 2008/045847 A2 | 4/2008 |

* cited by examiner

Primary Examiner—Jordan M. Schwartz

(57) ABSTRACT

The invention provides ophthalmic lenses useful in preventing myopia progression. The lenses of the invention provide substantially constant distance vision power zone in the center of the optic zone surrounded by a zone that provides positive longitudinal spherical aberration.

7 Claims, 2 Drawing Sheets ular zone may be provided, which second zone can provide one of constant power or progressively decreasing power. In yet another embodiment, lenses are provided having an optic zone comprising, consisting essentially of, and consisting of a substantially constant distance vision power at the centermost portion of the optic zone and at least a one region peripheral to the distance vision power having positive longitudinal spherical aberration.

OPHTHALMIC LENSES FOR PREVENTION OF MYOPIA PROGRESSION

FIELD OF THE INVENTION

The invention relates to ophthalmic lenses. In particular, the invention provides ophthalmic lenses useful for the prevention or retardation of myopia progression.

BACKGROUND OF THE INVENTION

Myopia, or near-sightedness, affects up to 25% of the United States population and, in some parts of the world, up to 75% of the population. In the myopic eye, the shape of the eyeball is elongated and light rays entering the eye are focused in front of the retina. The conventional treatment for myopia is prescribing corrective lenses. However, the typical corrective lens does not prevent the progression of myopia.

A number of methods to retard myopia progression, especially in children, have been proposed. These methods include using multifocal lenses, using lenses into which aberration is introduced or which control aberrations, using off-axis power lenses, reshaping the cornea, exercising the eye, and using pharmacological therapies.

The use of multifocal lenses and those having aberrations have proved to be disadvantageous in that the lenses compromise the wearer's distance vision. The other methods too suffer from disadvantages including discomfort, as with the corneal reshaping, and undesirable side effects, as with the drug therapies.

DETAILED DESCRIPTION OF THE INVENTION AND PREFERRED EMBODIMENTS

The invention provides ophthalmic lenses, and methods for their design and production, which lenses substantially prevent myopia progression. It is a discovery of the invention that myopia progression can be substantially prevented by providing a multifocal lens having an area of distance vision power in the center of the optic zone surrounded by at least one region that provides positive longitudinal spherical aberration.

By "ophthalmic lens" is meant a contact, intraocular, onlay lens or the like. Preferably, the lenses of the invention are contact lenses. By "distance optical power," "distance vision power" and "distance power" is meant the amount of refractive power required to correct the wearer's distance vision acuity to the desired degree. By "longitudinal spherical aberration" is meant the dioptric difference in focus between the center and the periphery of the lens calculated as the dioptric value of the peripheral ray's focus minus the dioptric value of the paraxial ray's focus. By "positive longitudinal spherical aberration" is meant that the dioptric difference between the peripheral and paraxial rays is a positive value.

In a first embodiment of the invention, ophthalmic lenses are provided which lenses have an optic zone comprising, consisting essentially of, and consisting of a central zone having substantially constant distance vision power and at least a first annular zone concentric with the central zone and having positive longitudinal spherical aberration. In an alternative embodiment, a second annular zone concentric with the first annular zone may be provided, which second zone can provide one of constant power or progressively decreasing power. In yet another embodiment, lenses are provided having an optic zone comprising, consisting essentially of, and consisting of a substantially constant distance vision power at the centermost portion of the optic zone and at least a one region peripheral to the distance vision power having positive longitudinal spherical aberration.

Figure 1:
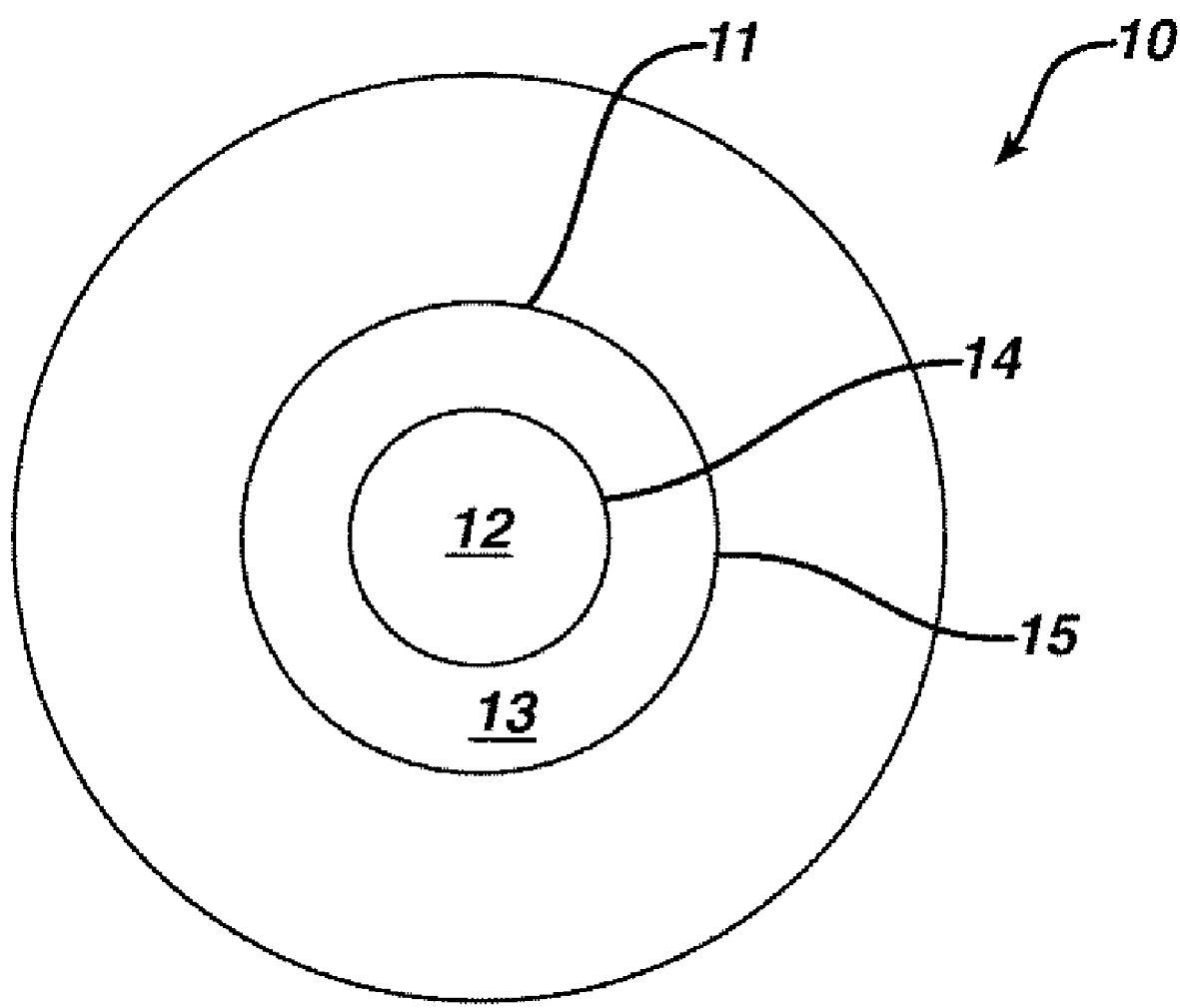
FIG. 1 depicts a front surface of a lens of the invention.

As seen in FIG. 1, lens 10 has optic zone 11 and non-optical, lenticular zone 14. Optic zone 11 is composed of central zone 12 and peripheral zone 13. Central zone 12 is centered at the optical axis of the lens and has a radius of about 0.5 to 2 mm and preferably about 1 to 1.5 mm measured from the optical center of the lens. The power within central zone 12 is substantially constant distance vision power and will be about +12.00 diopters to about −12.00 diopters. Due to the addition of the positive power in the peripheral zone, it may be desirable to provide overcorrection for the distance vision power in the central zone, meaning power in addition to that required to correct the wearer's distance vision acuity. The amount of overcorrection will depend upon the diameter of the central zone 12 and the magnitude of the positive spherical aberration provided. However, typically, the overcorrection will be about 0.25 to about 1.00 diopters.

Peripheral zone 13 provides positive longitudinal spherical aberration that continuously and progressively increases as one moves from the innermost boundary 14, or boundary closest to the optical center of the lens, to the outermost boundary 15 of periphery of zone 13. The increase in longitudinal spherical aberration in peripheral zone 13 may be about 0.25 to about 2 diopters, and preferably is about 0.5 to about 1.50 diopters, at a radius of about 2.5 mm from the optical center of the lens. Peripheral zone 13 may have a width of about 0.5 to about 3.5 mm, preferably about 1 to about 2 mm.

As shown in FIG. 1, central zone 12 and peripheral zone 13 are zones with discrete junctions therebetween. In an alternative embodiment, no discrete junction exists between the substantially constant distant vision power and the positive longitudinal spherical aberration, both the substantially constant distant vision power and the positive longitudinal spherical aberration forming one zone.

In designing the lenses of the invention, the positive longitudinal spherical aberration is induced beyond the correction of the wearer's ocular aberrations. Thus, for purposes of the invention, preferably the spherical aberration of the lens wearer is first determined and then the spherical aberration necessary to correct that aberration is provided. Alternatively, a population average, such as 0.1 D/mm$^2$ may be used for the spherical aberration. Spherical aberration may be measured by any known and convenient method including, without limitation, by use of a commercially available aberrometer.

Any of a number of mathematical functions may be used to design the optic zone of the lenses of the invention including, without limitation, spheres, aspheres, splines, conics, polynomials and the like. In a preferred embodiment, the central zone preferably is spherical and there is a smooth transition between the central and peripheral zone. Such a smooth transition may be ensured by use of mathematical functions that are continuous in magnitude and first and second derivatives.

One suitable equation for use in designing the optic zone of the lenses of the invention is:

$$y = \frac{x^2}{r + \sqrt{[r^2 - (1+k)x^2]}} \quad \text{(I)}$$

wherein y is the distance from the lens' center;

x is the sag value;

r is radius of curvature; and k is the conic constant and is 0 for a sphere, −1<k<0 for an ellipse and k<−1 for a hyperbola.

A conic of the following equation type may be used for an optic zone of a diameter D with a central spherical zone of diameter d for −d/2<x<d/2

$$y = \frac{x^2}{r + \sqrt{[r^2 - x^2]}} \quad \text{(II)}$$

and for d/2<x<D/2

$$y = \frac{(x - d/2)^2}{\{r + \sqrt{[r^2 - (x - d/2)^2]}\} - (x - d/2)^2} - \frac{(x - d/2)^2}{\{r + \sqrt{[r^2 - (1+k)(x - d/2)^2]}\}} \quad \text{(III)}$$

The sag values at any point may be converted to radii and the power of the lens at that point may be calculated using the following formula:

$$P = (n-1)\left[\frac{1}{r_1^2} - \frac{1}{r_2^2}\right] \quad \text{(IV)}$$

wherein P is the power; and n is the refractive index of the lens material.

The distance power and positive longitudinal spherical aberration may both be, and preferably are, on either the front or back surface of the lens or each on one of the front or back lens surfaces. One surface of the lens may provide the distance power and positive longitudinal spherical aberration and the other surface may be spherical, aspheric or incorporate cylinder power in order to correct the wearer's astigmatism. One ordinarily skilled in the art will recognize that for contact lens embodiments in which cylinder power is present, a stabilization means will need to be incorporated in the lens. Suitable stabilization means are any of the static and dynamic stabilization means known in the art including, without limitation, prism ballast, thin and thick zones, bosses and the like and combinations thereof.

In embodiments with a central zone and at least one concentric zone, a second zone concentric about the first such zone may be provided. The second zone may provide substantially constant power or preferably power that progressively decreases as one moves to the periphery of the zone. The second concentric zone may find utility in those lens wearers with large pupils, such as a young person in low illumination. The second zone preferably begins at a radius of about 3.5 mm and extends to a radius of about 4.5 mm. In embodiments in which the power progressively decreases across the zone, preferably the decrease reaches about half of the power found at the innermost portion of the zone. For example, if the lens has a 1.0 diopter positive longitudinal spherical aberration in the first concentric zone at a radius of about 2.5 mm, the power at the outermost portion of the second zone will be have decreased to about 0.5 diopters. In embodiments in which there is no discrete junction between the constant distant power and positive longitudinal spherical aberration, a second region that provides this constant power or progressively decreasing power may be provided at the periphery of the region of positive longitudinal spherical aberration. The inclusion of the second peripheral zone may be advantageous because it can be used to reduce the positive power in the periphery thereby reducing the visual compromise resulting from the positive power under low luminance conditions.

The lenses of the invention preferably are soft contact lenses, made of any material suitable for producing such lenses. Illustrative materials for formation of soft contact lenses include, without limitation silicone elastomers, silicone-containing macromers including, without limitation, those disclosed in U.S. Pat. Nos. 5,371,147, 5,314,960, and 5,057,578 incorporated in their entireties herein by reference, hydrogels, silicone-containing hydrogels, and the like and combinations thereof. More preferably, the surface is a siloxane, or contains a siloxane functionality, including, without limitation, polydimethyl siloxane macromers, methacryloxypropyl polyalkyl siloxanes, and mixtures thereof, silicone hydrogel or a hydrogel, such as etafilcon A.

A preferred lens-forming material is a poly 2-hydroxyethyl methacrylate polymers, meaning, having a peak molecular weight between about 25,000 and about 80,000 and a polydispersity of less than about 1.5 to less than about 3.5 respectively and covalently bonded thereon, at least one cross-linkable functional group. This material is described in U.S. Pat. No. 6,846,892 incorporated herein in its entirety by reference. Suitable materials for forming intraocular lenses include, without limitation, polymethyl methacrylate, hydroxyethyl methacrylate, inert clear plastics, silicone-based polymers, and the like and combinations thereof.

Curing of the lens forming material may be carried out by any means known including, without limitation, thermal, irradiation, chemical, electromagnetic radiation curing and the like and combinations thereof. Preferably, the lens is molded which is carried out using ultraviolet light or using the full spectrum of visible light. More specifically, the precise conditions suitable for curing the lens material will depend on the material selected and the lens to be formed. Polymerization processes for ophthalmic lenses including, without limitation, contact lenses are well known. Suitable processes are disclosed in U.S. Pat. No. 5,540,410 incorporated herein in its entirety by reference.

The contact lenses of the invention may be formed by any conventional method. For example, the optic zone may be produced by diamond-turning or diamond-turned into the molds that are used to form the lens of the invention. Subsequently, a suitable liquid resin is placed between the molds followed by compression and curing of the resin to form the lenses of the invention. Alternatively, the zone may be diamond-turned into lens buttons.

The invention may be further clarified by a consideration of the following examples:

EXAMPLES

Example 1

Figure 2:
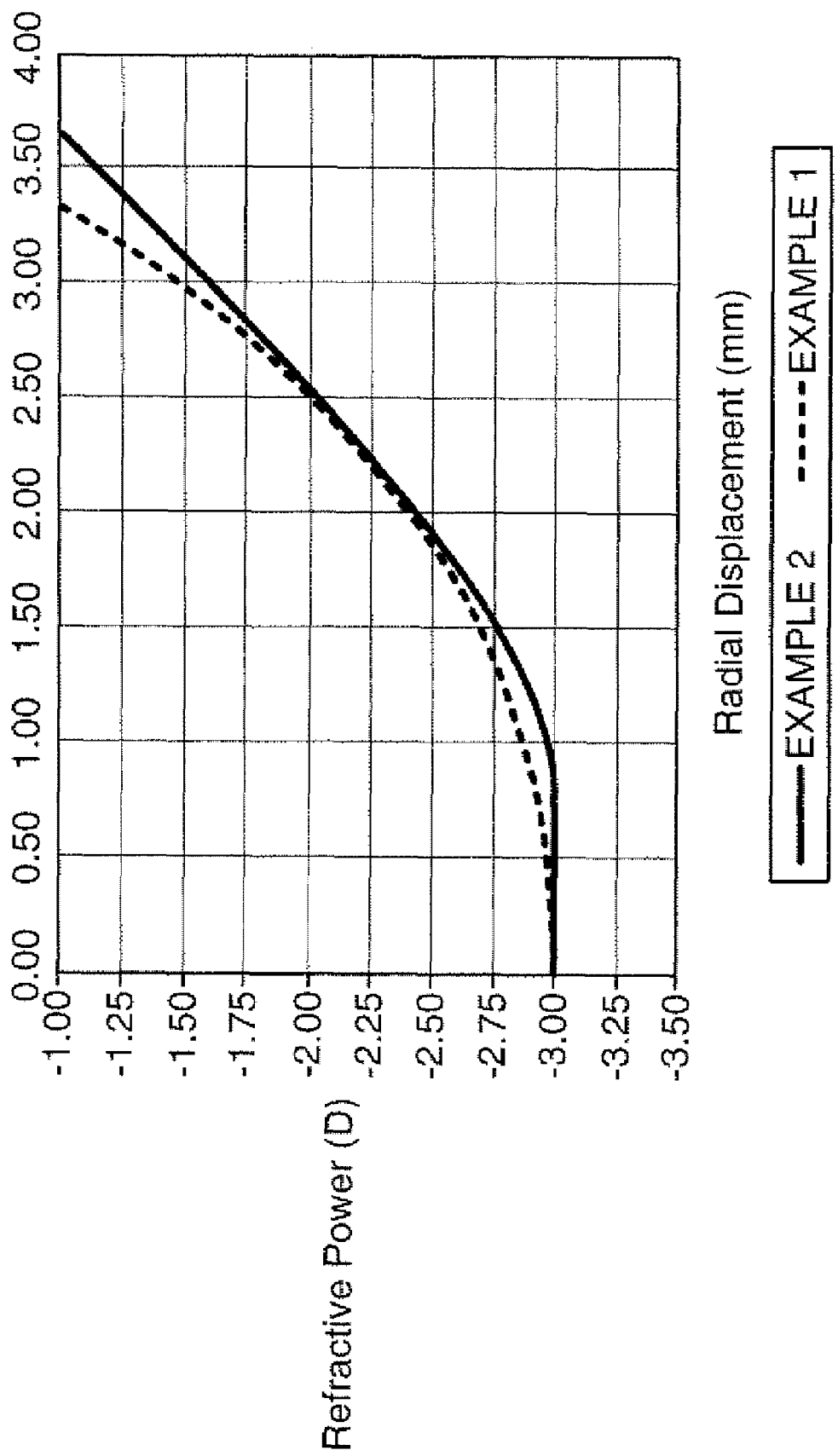
FIG. 2 is a graph depicting the power profiles of the lenses of the examples.

A lens of the invention is provided with a back surface of 8.8 mm radius of curvature and a front surface calculated in accordance with Equation II wherein $k+10^5$, $r=1.1$ and $d=0.75$ mm. The central zone power is −3.00 diopters and positive longitudinal spherical aberration of +1 diopters at 5 mm is provided. The lens is made using single point, diamond-turning into a brass insert followed by injection molding of a lens molds from the insert and casting of the lens using etafilcon A according to conventional lens manufacturing processes. The solid line in the graph of FIG. 2 depicts the power profile for the optic zone of the lens.

Comparative Example 1

A prior art lens designed made in accordance with the disclosure in U.S. Pat. No. 6,045,578 is provided with a back surface of 8.8 mm radius of curvature and a front surface calculated using Equation I with $k+3.5$. The central zone of the optic zone has a power of 3.00 diopters and positive longitudinal spherical aberration of +1 diopters at 5 mm is provided. The lens is made using single point, diamond-turning into a brass insert followed by injection molding of a lens molds from the insert and casting of the lens using etafilcon A according to conventional lens manufacturing processes. The dotted line in the graph of FIG. 2 depicts the power profile for the optic zone of the lens.

What is claimed is:

1. An ophthalmic lens, comprising an optic zone comprising a central zone having substantially constant distance vision rower and at least a first annular zone concentric with the central zone and intentionally having positive longitudinal spherical aberration in an amount sufficient for the prevention or retardation of myopia progression wherein a second annular zone comprises progressively decreasing power in the direction towards the periphery of the lens.

2. The ophthalmic lens of claim 1, wherein the distance vision power is overcorrected by about 0.25 to about 1.00 diopters.

3. A contact lens, comprising an optic zone comprising a central zone having substantially constant distance vision power; at least a first annular zone concentric with the central zone and intentionally having positive longitudinal spherical aberration in an amount sufficient for the prevention or retardation of myopia progression, wherein the distance vision power is overcorrected by about 0.25 to about 1.00 diopters and a second annular zone concentric with the first annular zone.

4. The contact lens of claim 3, wherein the second annular zone comprises substantially constant power.

5. The contact lens of claim 3, wherein the second annular zone comprises progressively decreasing power in the direction towards the periphery of the lens.

6. An ophthalmic lens, comprising an optic zone having a substantially constant distance vision power at the centermost portion of the optic zone and at least a first peripheral region to the distance vision power intentionally having positive longitudinal spherical aberration in an amount sufficient for the prevention or retardation of myopia progression wherein the distance vision power is overcorrected by about 0.25 to about 1.00 diopters.

7. The ophthalmic lens of claim 6, further comprising a second peripheral region wherein the second peripheral region comprises progressively decreasing power in the direction towards the periphery of the lens.

* * * * *